Figure 1:
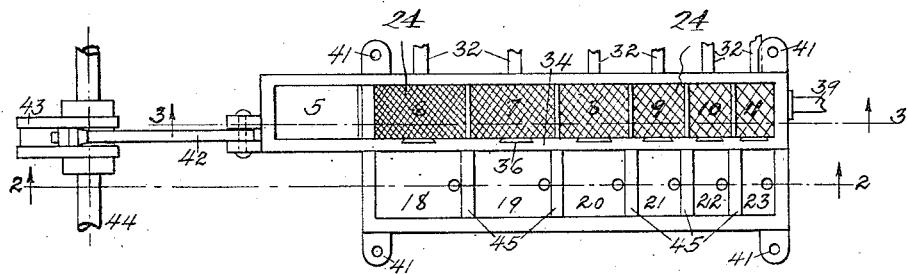

L. B. SKINNER.
MINERAL SEPARATOR AND CLASSIFIER.
APPLICATION FILED MAY 15, 1912.

1,054,799.

Patented Mar. 4, 1913.
2 SHEETS—SHEET 1.

WITNESSES:

INVENTOR
Lewis B. Skinner
BY Jno. H. Whipple
ATTORNEY

L. B. SKINNER.
MINERAL SEPARATOR AND CLASSIFIER.
APPLICATION FILED MAY 15, 1912.

1,054,799.

Patented Mar. 4, 1913.

2 SHEETS—SHEET 2.

WITNESSES:

INVENTOR
Lewis B. Skinner
BY
Jno. H. Whipple
ATTORNEY

UNITED STATES PATENT OFFICE.

LEWIS B. SKINNER, OF DENVER, COLORADO.

MINERAL SEPARATOR AND CLASSIFIER.

1,054,799. Specification of Letters Patent. Patented Mar. 4, 1913.

Application filed May 15, 1912. Serial No. 697,419.

*To all whom it may concern:*

Be it known that I, LEWIS B. SKINNER, of Denver, in the State of Colorado, have invented certain new and useful Improvements in Mineral Separators and Classifiers, of which the following is a specification.

My invention relates to separators and classifiers in which a series of screens is employed in combination with a constant flow of water under pressure; and the objects of my improvements are, first, to make a very efficient apparatus; second, to employ inclined screens in combination with an upward continuous flow of water through the screens; third, to provide means whereby the apparatus is constantly shaken horizontally; fourth, to provide means for regulating the flow of water and regulating the movement of the material through the apparatus; fifth, to make a simple, cheap and durable construction and to provide other features to become apparent from the description to follow.

In prior classifiers, a pulsating force is generally applied practically vertically by means of pulsating water in an attempt to keep the ore bed free and to disentangle the material in the sorting columns. Experiment has proven to me that a shaking motion applied horizontally would more suitably maintain the ore in condition to be acted upon by aiding materially in propulsion and that disentanglement in the sorting column would be more pronounced by sidewise reciprocating impulses than by vertical impulses. The result of much study and experiment by me along this line is the evolution of a classifier of the following description which is presented as the subject of this application for Letters Patent therefor. I found that much trouble might be eliminated by the use of a screen sloping from the feed end to the last compartment of the apparatus instead of by the use of a screen which is substantially horizontal as heretofore used with vertically pulsating water. Further experience with this altered classifier convinced me that still greater improvement was possible provided the different forces acting in the classifier could be brought under separate means of control and each made to do its work independently of the others. Some form of vibratory motion is certainly desirable, but in order to be most efficient it should act as a separate force and not as a quality of the hydraulic water. The idea of the shaking classifier then suggested itself. In this a reciprocatory motion imparted to the classifier box would act as a disentangling and transportation force when used in connection with an inclined screen, while non-pulsating hydraulic water could furnish the necessary sorting column water.

My improved classifier comprises a box, adapted to be shaken longitudinally, which is divided into a series of vertical compartments and which has an inclined screen placed between the compartments and their corresponding hutches placed directly below the compartments. The inclination of the screen may be all in one plane from the feed end to the last compartment, or the inclination may be changed at the various compartments. Hydraulic water without pulsations is introduced into the hutches, the velocity being regulated suitably for each compartment. The screen is preferably a miniature grizzly made of thin spring brass bars spaced apart, but may be any sort of a perforated surface.

To describe my invention so that others versed in the art to which it pertains can make and use the same, I have illustrated it on the accompanying two sheets of drawings forming a part of this specification, in which—

Figure 2:
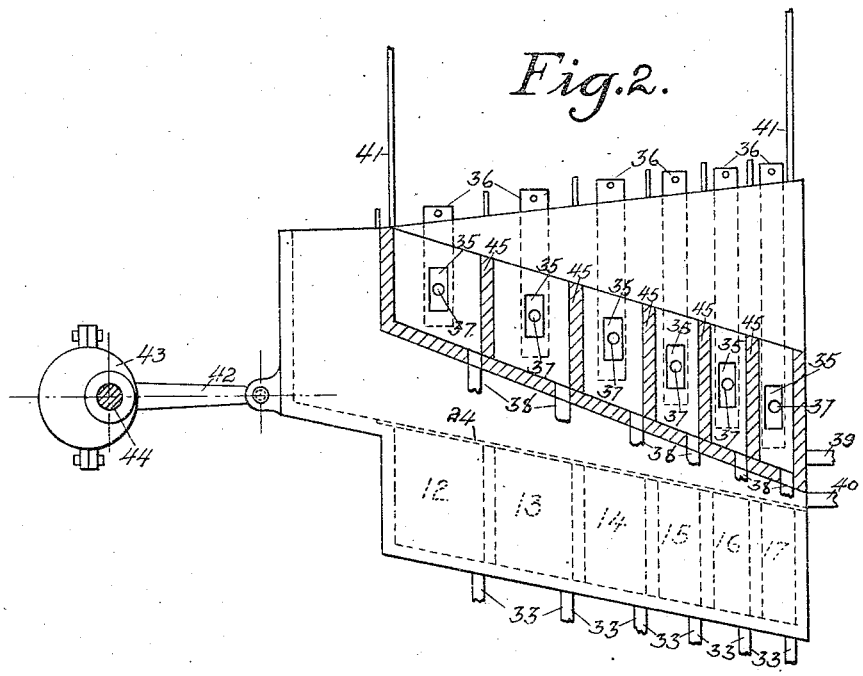
Figure 3:
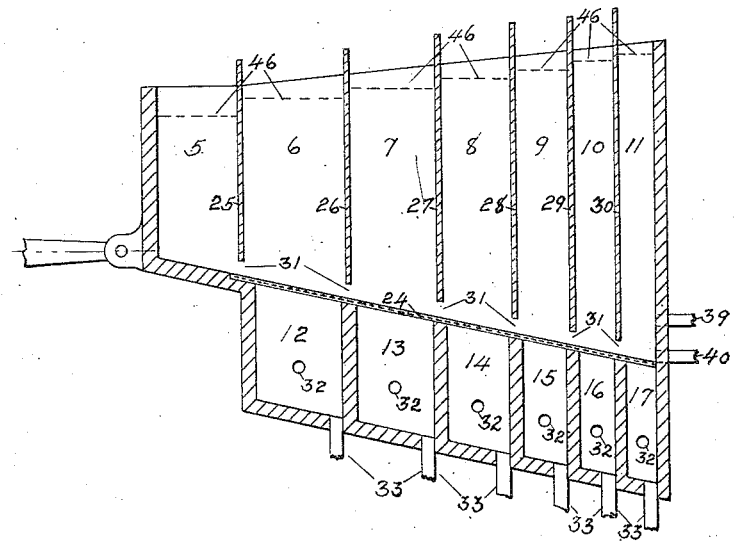
Figure 4:
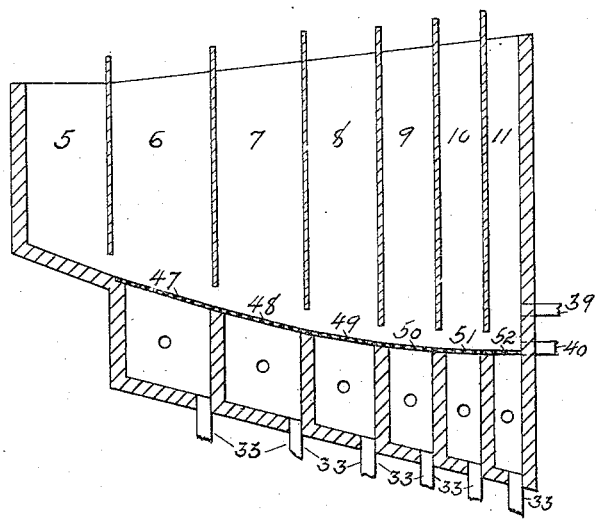

Figure 1 is a plan view of an apparatus embodying my invention; Fig. 2 is a vertical sectional view taken on line 2—2 of Fig. 1; Fig. 3 is a similar view taken on line 3—3 of Fig. 1; and Fig. 4 is a similar view showing a modified form.

Similar reference characters refer to similar parts throughout the several views.

The device comprises a rectangular box provided with seven upper compartments 5, 6, 7, 8, 9, 10 and 11; six hutches 12, 13, 14, 15, 16 and 17 directly below the upper compartments; and a series of six receiving compartments 18, 19, 20, 21, 22 and 23 arranged beside the first named compartments. An inclined screen 24 forms the only separating partition between the upper compartments and the lower hutches, which are arranged to register one above the other, there being no lower hutch to register with compartment 5 which is the receiving compartment into which the material is fed. The vertical partitions 25, 26, 27, 28, 29 and 30 which separate the compartments 5, 6, 7, 8, 9, 10 and 11 do not extend all the way down to the screen 24 thus forming an opening 31 between every two compartments through which the material to be separated passes.

Each of the lower hutches is provided with an inlet pipe 32 for water under pressure and with an inlet pipe 33 in its bottom for the removal of any material which may settle therein. The six side compartments 18 to 23 inclusive are arranged directly opposite each of the upper compartments 6 to 11 inclusive and the wall 34 which separates them is provided with six openings 35 forming communications between the six upper compartments and the six side compartments. A vertically sliding gate 36 may be provided to close each opening 35 and has a smaller hole 37 therethrough so that the opening actually forming communication between the upper compartments and the side compartments can be shifted to a higher or lower level if desired, or rigidly fixed discharge holes may be used having arrangements such as gate valves (not shown) to increase or diminish the area of discharge.

Each side compartment 18 to 23 inclusive is provided with a discharge pipe 38 at the bottom for taking off the material which discharges to each of said side compartments. At the bottom of the last upper compartment 11, two pipe openings 39 and 40 are provided, one at a higher level than the other, the lower for taking off the material which settles to the screen in said compartment and the upper for admission of additional water which may be used to introduce water above the screen.

It is understood that I do not confine myself to the use of six compartments, a lesser or greater number may be used, and it is further understood that it is not essential to have side discharge compartments 18, 19, 20, 21, 22 and 23. Pipe connections or other suitable arrangements (not shown) may be used to definitely regulate the different sorting column velocities as opposed to the practice heretofore used, in a supporting screen classifier, of having overflow areas so large that there would be no reasonable restriction of the velocity of the water which might flow to the discharge of any one compartment.

The whole apparatus is supported so that it is free to move from left to right and vice versa as viewed in the drawings, as by suspension rods 41, and is connected by rod 42 to an eccentric 43 on shaft 44 which is constantly rotated by any suitable power.

In operation the ore or pulverized material is gradually fed into compartment 5; the water under pressure is admitted through the feed pipes 32 and is regulated by suitable valves to flow into the hutches in greater or lesser quantities as desired. The water thus admitted passes upward through the screen 24 into the registering compartments above and from thence flows by gravity through the several gate openings 37 into the registering side compartments 18 to 23 inclusive, from whence it flows through discharge openings 38. The shaft 44 is rotated which transmits a shaking motion to the box comprising the compartments and hutches, and the material from compartment 5 feeds by force of gravity down the inclined screen 24 and through opening 31 under partition 25; some of the material will pass upward with the flow of water through the gate opening 37 and be delivered to the side compartment 18; some will gravitate down through the screen 24 against the upward flow of water and settle in hutch 12, and some will pass downward on the inclined screen 24 through the opening 31 under partition 26 and into the third upper compartment 7 where another separation or classification takes place, some of the material being carried up with the stronger flow of water and be delivered to the side compartment 19, some again gravitating through the supporting screen and settling down in the hutch 13, while some continues to gravitate along the inclined screen 24, through the opening 31 under partition 27 into compartment 8 where another separation or classification takes place by means of the still stronger upward flow of water which will cause some material to be deposited in the side compartment 20; some to be deposited in the hutch 14; and some to pass on into compartment 9 where still another separation or classification takes place; and thus the ore or material passes along through the whole system of compartments until the heaviest and largest particles are either removed at the opening 40 or else are affected by a sufficiently great hydraulic and sorting column velocity at compartment 11 to cause entire flotation.

The dotted lines 46 across the upper ends of compartments 5 to 11 inclusive (in Fig. 3) indicate the approximate level of water in each compartment; the water level in the first or high end compartments will not necessarily be lower than the water level in the tail or low end compartments, but I find this to be of advantage in holding back the material in the preceding compartment. Such water levels will vary according to the variance in the upward flow of water.

In Fig. 4 I have illustrated a modified form of the device in which the screens 47, 48, 49, 50, 51 and 52 are each set on a different angle of inclination; the first screen in the circuit of operations being set on the greatest incline; the second screen in the circuit of operations being set on a slightly less incline, and so on each succeeding screen throughout the whole series is on a less incline than the preceding screen, the last or tail end screen being on the least incline. It is calculated that this arrangement of inclining the screens will facilitate the work and more evenly distribute the work of separating and classifying over the entire screen surface.

What I claim is—

1. In a device of the class described, a series of compartments separated by vertical partitions terminating a short distance above the bottom of the compartments forming communicating openings between the compartments, a series of hutches arranged in registering positions below the said compartments, inclined screens forming the bottoms of the compartments and the tops of the hutches, water supply pipes connected to the hutches whereby an upward flow of water is passed through said screens, and means for shaking the said compartments and hutches approximately horizontally.

2. In an apparatus of the class described, the combination with a horizontal succession of vertically-elongated flexibly-supported chambers each provided near the bottom with an inlet for the admission of mingled water and solid substances, a water and solids outlet at a higher level than said water and solids inlet, and a water inlet at a lower level than said water and solids inlet; said chambers being adapted to deliver through said water and solids outlet the heavier grades of material from one to another throughout their succession; of a screen in the lower part of each of said chambers at a higher level than said water inlet; a tubular connection of said water inlet with a source of water under pressure; and mechanism for producing a horizontal shaking movement of said chambers.

3. In an apparatus of the class described, the combination with a longitudinal series of vertically-elongated flexibly-supported chambers separated by intervening partitions and adapted to deliver their heavier grades of material from one to another past the said intervening partitions, each chamber provided with an inlet near its bottom for the admission of mingled water and solid substances, a water and solids outlet at a higher level than said inlet, an inclined screen in the lower part just below the inlet, a water inlet beneath said screen communicating with a source of water under pressure, and mechanism for producing a horizontal shaking movement of said chambers.

4. In an apparatus of the class described, the combination with a longitudinal series of vertically-elongated flexibly-supported chambers separated by intervening partitions and adapted to deliver their heavier grades of material from one to another past the said intervening partitions, each chamber provided with an inlet near its bottom through the intervening partitions for the admission of mingled water and solid substances, a water and solids outlet at a higher level than said inlet, means for adjusting the relative distances of said water and solids outlets from said inlets, means for regulating the amount of water and solids discharged, an inclined screen in the lower part of each of said chambers, a water inlet beneath said screens communicating with a source of water under pressure, and mechanism for producing a horizontal shaking movement of said chambers.

5. In an apparatus of the class described, the combination with a longitudinal series of vertically-elongated flexibly-supported chambers separated by intervening partitions and adapted to deliver their heavier grades of material from one to another past the said intervening partitions, each of said chambers provided with an inlet near its bottom through the intervening partition for the admission of mingled water and solid substances, a water and solids outlet at a higher level than said inlet, means for adjusting the relative distances of said outlets from said inlets, means for regulating the amount of water and solids discharged, an inclined screen in the lower part of each compartment below the inlet, a hutch below the screen of each compartment, means for the draining from the hutch of any sediment from the water supply or any solids which may drop through the screen, a water inlet beneath each screen communicating with a source of water pressure, and mechanism for producing a horizontal shaking movement of said chambers.

6. In a device of the class described, a succession of compartments having openings through their vertical partitions at the plane of the bottom of said compartments, a screen arranged below said compartments and forming the bottom thereof, a hutch beneath said screen, means for producing a continuous flow of water to the hutch, a flexible support for said compartment device as a whole, and means for communicating a substantially horizontal reciprocating movement to the same.

LEWIS B. SKINNER.

Witnesses:
H. E. LYNDES,
A. B. DAVIS.